United States Patent [19]

Igarashi et al.

[11] Patent Number: 5,556,527
[45] Date of Patent: Sep. 17, 1996

[54] PROCESS FOR FORMATION OF MULTILAYER FILM

[75] Inventors: Kazuo Igarashi, Wako; Kengo Takano, Itsukaichi-machi; Toshiharu Morita, Nishitama-gun; Hiroaki Saito, Hidaka; Yukio Hashizume, Sayama; Tokio Suzuki, Kanuma; Hirohisa Tashiro, Kanuma; Mituru Muramoto, Kanuma; Katsunori Sato, Kanuma, all of Japan

[73] Assignees: Honda Giken Kogyo Kabushiki Kaisha; Kansai Paint Co., Ltd., both of Japan

[21] Appl. No.: 498,476

[22] Filed: Jul. 5, 1995

[30] Foreign Application Priority Data

Jul. 5, 1994 [JP] Japan .................................. 6-174903

[51] Int. Cl.$^6$ .................................................. C25D 13/00
[52] U.S. Cl. .......................... 204/488; 204/487; 204/500; 427/407.1; 427/409
[58] Field of Search ................................ 204/181.1, 500; 427/409, 407.1

[56] References Cited

U.S. PATENT DOCUMENTS

| | | | |
|---|---|---|---|
| 4,539,258 | 9/1985 | Panush | 427/409 |
| 4,948,829 | 8/1990 | Mitsuji et al. | 524/457 |
| 5,227,422 | 7/1993 | Mitsuji et al. | 524/457 |
| 5,322,865 | 6/1994 | Inoue et al. | 524/457 |

FOREIGN PATENT DOCUMENTS 4-59136  9/1992  Japan .

*Primary Examiner*—John Niebling
*Assistant Examiner*—Kishor Mayekar
*Attorney, Agent, or Firm*—Wenderoth, Lind & Ponack

[57] ABSTRACT

The present invention provides a process for forming a multilayer film, which comprises: applying a cationic electrocoating (A) and an intermediate coating (B) in this order, followed by heat-curing, applying thereon a coloring base coating (C) capable of forming a colored film having a value of N 7 to N 9 in Munsell's color system, applying, without curing the coloring base coating (C) applied above, an iridescent base coating (D) containing a scaly mica powder coated with titanium oxide, followed by preliminary drying at 50°–100° C., and applying a clear coating (E), followed by heating to subject the films of the coatings (C), (D) and (E) simultaneously to crosslinking and curing, wherein the coloring base coating (C) and the iridescent base coating (D) are each a thermosetting aqueous coating containing, as vehicle components, an acrylic resin emulsion (a), a urethane resin emulsion (b) and a crosslinking agent (c). The process can form a multilayer film superior in iridescence feeling, depth feeling, smoothness, distinctness of image gloss, etc. and is suitably used for coating of, in particular, automobile body panel.

32 Claims, No Drawings

PROCESS FOR FORMATION OF MULTILAYER FILM

BACKGROUND OF THE INVENTION

1. Field of the Invention

The present invention relates to a process for forming a multilayer film superior in iridescence feeling, depth feeling, smoothness, distinctness of image gloss, etc., which process is suitably used for coating of, in particular, automobile body panel.

2. Description of the Related Art

It is already in practice to form an iridescent film by the use of a coating containing a scaly mica powder coated with a metal oxide such as titanium oxide or the like. It is already known, for example, to form a multilayer film by applying, on a primer-coated surface, an organic solvent type base color capable of forming a film of N 4 to N 8 in Munsell's color system, then applying, without curing the above-applied base color, an organic solvent type transparent iridescent coating containing a mica powder coated with a metal oxide and also a clear coating, and heat-curing the above-applied three coatings simultaneously (see, for example, Japanese Patent Publication No. 59136/1992 and corresponding U.S. Pat. No. 4,539,258).

The multilayer film formed by the above approach, however, is insufficient in iridescence feeling, depth feeling, smoothness, distinctness of image gloss, etc. and moreover inferior in chipping resistance. These drawbacks of the film are very serious when the film is formed on the body panel of automobile where the appearance of the film is important. Hence, the drawbacks need by eliminated urgently.

SUMMARY OF THE INVENTION

The main object of the present invention is to eliminate the above-mentioned drawbacks of the iridescent multilayer film formed by the use of a scaly mica powder coated with titanium oxide and provide a novel process for forming a multilayer film superior in iridescence feeling, depth feeling, smoothness, distinctness of image gloss, chipping resistance, etc.

According to the present invention there is provided a process for forming a multilayer film, which comprises:

- applying a cationic electrocoating (A) and an intermediate coating (B) in this order, followed by heat-curing,
- applying thereon a coloring base coating (C) capable of forming a colored film having a value of N 7 to N 9 in Munsell's color system,
- applying, without curing the coloring base coating (C) applied above, an iridescent base coating (D) containing a scaly mica powder coated with titanium oxide, followed by preliminary drying at 50°–100° C., and
- applying a clear coating (E), followed by heating to subject the films of the coatings (C), (D) and (E) simultaneously to crosslinking and curing, wherein the coloring base coating (C) and the iridescent base coating (D) are each a thermosetting aqueous coating containing, as vehicle components, an acrylic resin emulsion (a), a urethane resin emulsion (b) and a crosslinking agent (c).

The multilayer film formed by the present process consists of a cationic electrocoating film, an intermediate coating film, a coloring base coating film, an iridescent base coating film and a clear coating film. The features of the present invention lie in that said coloring base coating film and said iridescent base coating film are each formed by the use of a thermosetting aqueous coating containing, as vehicle components, an acrylic resin emulsion, a urethane resin emulsion and a crosslinking agent and further that said coloring base coating film is formed on said intermediate coating film. As a result, the present process can eliminate all of the above-mentioned drawbacks and can provide a multilayer film superior in iridescence feeling, depth feeling, smoothness, distinctness of image gloss, chipping resistance, etc.

DETAILED DESCRIPTION OF THE INVENTION

Detailed description is hereinafter made on the present process for formation of multilayer film.

Cationic Electrocoating (A)

The cationic electrocoating (A) used in the present process has no particular restriction as to its kind and can be a per se known cationic electrocoating, for example, a coating obtained by mixing an aqueous solution or dispersion of a salt of a cationic polymer, as necessary with a pigment or additives. The cationic polymer includes, for example, an acrylic resin having a crosslinkable functional group or an amino group-introduced epoxy resin, and these resins can be made water-soluble or water-dispersible by neutralization with an organic acid or an inorganic acid. The crosslinking agent used to cure said resin is preferably a blocked polyisocyanate, an alicyclic epoxy resin or the like.

The cationic electrocoating (A) can be applied by using a per se known method, for example, by immersing a metallic material (e.g. an automobile body panel) as a cathode in a bath consisting of said cationic electrocoating and passing an electric current between said cathode and an anode under ordinary conditions to precipitate said resin, etc. on the metallic material.

The preferable thickness of the resulting electrocoating film is generally 10–40μ, particularly 15–35μ as cured. The film can be crosslinked and cured by heating generally at about 140°–220° C. for about 10–40 minutes. In the present process, the intermediate coating (B) may be applied before the cationic electrocoating (A) is cured; however, it is generally preferable that the intermediate coating (B) is applied after the cationic electrocoating (A) has been cured.

Intermediate Coating (B)

The intermediate coating (B) coated on the applied cationic electrocoating (A) according to the present process has no particular restriction, either, as to its kind. However, it can generally be a coating containing a resin component and a solvent, as main components, and as necessary a coloring pigment, an extender pigment, other additives for coating, etc. The intermediate coating (B) is important for the improvement of the multilayer film to be obtained, in smoothness, distinctness of image gloss (image sharpness), gloss, etc.

The preferable resin component used in the intermediate coating (B) is generally a thermosetting resin composition. A specific example of the composition is a combination of a base resin (e.g. an acrylic resin, a polyester resin or an alkyd resin each having a crosslinkable functional group) and a crosslinking agent (e.g. a melamine resin, a urea resin or a blocked or non-blocked polyisocyanate compound).

The solvent used in the intermediate coating (B) can be an organic solvent or water.

The intermediate coating (B) can be applied on the film (preferably crosslinked and cured) of the cationic electrocoating (A) by an ordinary method such as electrostatic coating, air spraying, airless spraying or the like. The preferable thickness of the applied intermediate coating (B) is generally 10–50μ, particularly 20–40μ as cured. The film is can be crosslinked and cured generally at a temperature of about 100°–170° C.

In the present process, after the film of the intermediate coating (B) has been crosslinked and cured, the coloring base coating (C), which is described below, is applied.

Coloring Base Coating (C)

The coloring base coating (C) applied on the crosslinked and cured film of the intermediated coating (B) according to the present process is a thermosetting aqueous coating which is capable of forming a film having a value of N 7 to N 9 in Munsell's color system and which contains, as vehicle components, an acrylic resin emulsion (a), a urethane resin emulsion (b) and a crosslinking agent (c).

Description is made below on these vehicle components.

Acrylic Resin Emulsion (a)

The acrylic resin emulsion (a) is a homogeneous dispersion of acrylic resin particles in an aqueous dispersing medium and can generally be produced by emulsion-polymerizing an acrylic monomer in an aqueous solution of a dispersion stabilizer.

The dispersion stabilizer is preferably a nonionic surfactant, an anionic surfactant or a hydrophilic resin (e.g. an acrylic resin) having an acid value of 20–150, particularly 30–80 and a number-average molecular weight of 5,000–30,000, particularly 8,000–20,000.

The aqueous dispersing medium is an aqueous solution obtained by dissolving the dispersion stabilizer in water.

The acrylic monomer includes, for example, monoesters between (meth)acrylic acid and a monohydric alcohol having 1–20 carbon atoms, such as methyl (meth)acrylate, ethyl (meth)acrylate, propyl (meth)acrylate, butyl (meth)acrylate, 2-ethylhexyl (meth)acrylate and the like; compounds having two or more polymerizable double bonds in the molecule, each obtained by reacting (meth)acrylic acid with a dihydric or polyhydric alcohol having 2–16 carbon atoms, such as ethylene glycol di(meth)acrylate, 1,6-hexane glycol di(meth)acrylate, trimethylolpropane di(meth)acrylate, allyl (meth)acrylate, trimethylolpropane trimethacrylate and the like; and hydroxyl group-containing alkyl (meth)acrylates each having 2–10 carbon atoms, such as hydroxyethyl (meth)acrylate, hydroxypropyl (meth)acrylate and the like. These compounds can be used singly or in combination of two or more.

The acrylic monomer can be used together with other copolymerizable monomer. As the other copolymerizable monomer, there can be mentioned, for example, α,β-ethylenically unsaturated carboxylic acid such as monocarboxylic acid [e.g. (meth)acrylic acid], dicarboxylic acid (e.g. maleic acid, fumaric acid or itaconic acid), half ester of such dicarboxylic acid and the like; N-propoxymethyl(meth)acrylamide; N-butoxymethyl(meth)acrylamide; glycidyl (meth)acrylate; styrene; and vinyl acetate. The other copolymerizable monomer can be used in an amount of generally 60% by weight or less, preferably 1–50% by weight, more preferable 5–30% by weight based on the total weight of the monomers used.

The component (a) is preferably an acrylic resin emulsion obtained by emulsion-polymerizing the acrylic monomer together with the α,β-ethylenically unsaturated carboxylic acid and, as necessary, other copolymerizable monomer. The emulsion polymerization is desirably conducted by multistage polymerization because the resulting component (a) gives a coloring base coating (C) having improved coatability. That is, when emulsion polymerization is conducted first by (co)polymerizing an acrylic monomer containing no α,β-ethylenically unsaturated carboxylic acid or containing a small amount (e.g. 3% by weight or less based on the total monomers) of α,β-ethylenically unsaturated carboxylic acid, together with, as necessary, other copolymerizable monomer and then by copolymerizing said acrylic monomer containing a large amount (e.g. 5–30% by weight based on the total monomers) of said unsaturated acid and, as necessary, other copolymerizable monomer, the resulting emulsion obtained by multistage polymerization is preferable from the standpoint of coatability (sagging and unevenness can be prevented) because the emulsion causes thickening when said unsaturated acid is neutralized with a neutralizing agent. As the neutralizing agent, there can be used ammonia, or water-soluble amino compounds such as monoethanolamine, methylamine, ethylamine, dimethylamine, diethylamine, trimethylamine, triethylamine, triisopropylamine, tributylamine, N-alkylmorpholine, propylamine, dipropylamine, isopropylamine, diisopropylamine, methylisopropanolamine, diisopropanolamine, monoisopropanolamine, diethanolamine, triethanolamine, butylamine, dibutylamine, 2-ethylhexylamine, ethylenediamine, propylenediamine, methylethanolamine, dimethylethanolamine, diethylethanolamine, cyclohexylamine, morpholine, pyridine and the like.

More specifically, the acrylic emulsion (a) may be prepared by a multistage polymerization process by first (co)polymerizing an acrylic monomer containing a small amount of (about 3% by weight or less based on the total monomers) or no α,β-ethylenically unsaturated acid, optionally with other copolymerizable monomer and subsequently (co)polymerizing the resulting polymer with an acrylic monomer containing a large amount of (about 5–30% by weight based on the total monomers) the unsaturated acid, and optionally with other copolymerizable monomer.

Urethane Resin Emulsion (b)

The urethane resin emulsion (b) is preferably an aqueous dispersion of a self-emulsifiable urethane resin having an average particle diameter of generally about 0.001–1 μm, particularly about 0.01–0.5 μm, prepared by (i) an aliphatic and/or alicyclic diisocyanate, (ii) a polyetherdiol or polyesterdiol having a number-average molecular weight of generally 500–5,000, preferably 1,000–3,000 or a mixture thereof, (iii) a low-molecular weight polyhydroxyl compound and (iv) a dimethylolalkanoic acid in the presence or absence of a hydrophilic organic solvent having no active hydrogen group in the molecule, in an NCO/OH equivalent ratio of 1.1–1.9, particularly 1.1–1.5 by one shot method or multistage method to form a urethane prepolymer, then mixing the prepolymer with water after or while neutralizing the prepolymer with an amine, to simultaneously give rise to (1) a reaction for chain extension by water and (2) emulsification and dispersion in water, and as necessary distilling off the organic solvent.

The aliphatic and alicyclic diisocyanates (i) used in production of said urethane prepolymer include aliphatic diisocyanates each having 2–12 carbon atoms, such as hexamethylene diisocyanate, 2,2,4-trimethylhexane diisocyanate, lysine diisocyanate and the like; alicyclic diisocyanates each having 4–18 carbon atoms, such as 1,4-cyclohexane diisocyanate, 1-isocyanato-3 -isocyanatomethyl-3,5,5-trimethylcyclohexane (isophorone diisocyanate, IPDI) 4,4'-dicyclohexylmethane diisocyanate, methylcyclohexylene diisocyanate, isopropylidenedicyclohexyl-4,4'-diisocyanate and the like; modification products of these diisocyanates (e.g. carbodiimide-, uretidion- or urethonimine-containing modification products); and mixtures of two or more of the above. Of these, preferred are alicyclic diisocyanates, particularly 1,4-cyclohexane diisocyanate, 1-isocyanato-3-isocyanatomethyl-3,5,5-trimethylcyclohexane and 4,4'-dicyclohexylmethane diisocyanate.

Use of an aromatic diisocyanate as the component (i) is generally undesirable because the resulting film easily undergoes yellowing during baking and curing and also discoloration by ultraviolet rays.

The polyetherdiol and polyesterdiol (ii) having a number-average molecular weight of generally 500–5,000, preferably 1,000–3,000, used in production of the urethane prepolymer include, for example, those diols obtained by polymerizing or copolymerizing (block-copolymerizing or random-copolymerizing) an alkylene oxide (e.g. ethylene oxide, propylene oxide or butylene oxide) and/or a heterocyclic ether (e.g. tetrahydrofuran), such as polyethylene glycol, polypropylene glycol, polyethylene-propylene (block or random) glycol, polytetramethylene ether glycol, polyhexamethylene ether glycol, polyoctamethylene ether glycol and the like; those diols obtained by polycondensing a dicarboxylic acid (e.g. adipic acid, succinic acid, sebacic acid, glutaric acid, maleic acid, fumaric acid or phthalic acid) and a glycol (e.g. ethylene glycol, propylene glycol, 1,4-butanediol, 1,6-hexanediol, 3-methyl-1,5 -pentanediol, neopentyl glycol or bishydroxymethylcyclohexane), such as polyethylene adipate, polybutylene adipate, polyhexamethylene adipate, polyneopentyl adipate, poly-3-methylpentyl adipate, polyethylene/butylene adipate, polyneopentyl/hexyl adipate and the like; polylactonediols such as polycaprolactonediol, poly-3-methylvalerolactonediol and the like; polycarbonatediols; and combinations of two or more of the above.

The low-molecular weight polyhydroxyl compound (iii) used in production of the prepolymer is preferably those having a number-average molecular weight of less than 500 and includes, for example, the glycols mentioned above with respect to the raw materials for polyesterdiol, and alkylene oxide adducts thereof (both the glycols and the adducts have a molecular weight of less than 500); trihydric alcohols (e.g. glycerine, trimethylolethane and trimethylolpropane) and alkylene oxide adducts thereof (both the alcohols and the adducts have a molecular weight of less than 500); and mixtures of two or more of the above. Of these, preferred are butanediol, trimethylolpropane and hexanediol. The low-molecular weight polyhydroxyl compound can be used in an amount of generally 0.1–20% by weight, preferably 0.5–10% by weight based on the total amount of the polyetherdiol and the polyesterdiol (ii).

The dimethylolalkanoic acid (iv) used in production of the urethane prepolymer includes, for example, dimethylolacetic acid, dimethylolpropionic acid and dimethylolbutyric acid. Of these, dimethylolpropionic acid is preferred. The amount of the dimethylolalkanoic acid used can be generally 0.5–5% by weight, preferably 1–3% by weight in terms of the amount of carboxyl group present in the urethane prepolymer obtained by reaction of the components (i) to (iv). When the amount of carboxyl group is less than 0.5% by weight, it is difficult to obtain a stable emulsion. When the amount is more than 5% by weight, the resulting prepolymer has high hydrophilicity and the resulting emulsion has a significantly high viscosity, and moreover the resulting film tends to have reduced water resistance.

The amine used for neutralization of the urethane prepolymer can be at least one compound selected from the ammonia and water-soluble amino compounds mentioned with respect to the component (a). The amount of the amine used for neutralization can be generally 0.5–1 equivalent, preferably 0.7–1 equivalent per one equivalent of the carboxyl group in the urethane prepolymer, derived from the dimethylolalkanoic acid.

Crosslinking Agent (c)

The crosslinking agent (c) is used to crosslink and cure the acrylic resin emulsion (a) and the urethane resin emulsion (b). Suitable for use as the crosslinking agent (c) are a melamine resin and a phenol-formaldehyde resin both for coating, with the former resin being particularly suitable. These resins may be either water-soluble or hydrophobic, but it is generally preferable to use a hydrophobic resin because such a resin can provide higher coatability, storage stability and moisture resistance.

Suitable as the hydrophobic melamine are, for example, those having a solvent dilution of 20 or less, preferably 15 or less and a weight-average molecular weight of 800–4,000, preferably 1,000–3,000. Herein, "solvent dilution" is an index indicating the solubility of melamine resin in hydrophilic solvent. A lower solvent dilution is more hydrophobic. The solvent dilution can be measured by placing 2 g of a melamine resin in a 50-cc beaker, placing the beaker on a paper in which No. 5 type has been printed, then dropwise adding, into the beaker, a 35/65 (by weight) water-methanol mixed solvent at 25° C. with stirring until reading of the type becomes impossible, and recording the volume (cc) of the solvent added. The solvent dilution is expressed as a value (cc/g) obtained by dividing the volume (cc) of the solvent added by the amount (g) of the melamine resin used.

As to said melamine resin, there is no particular restriction as long as the resin satisfies the above requirements for solvent dilution and molecular weight. There can be used various etherified melamine resins, for example, those melamine resins modified with at least one of methyl alcohol, ethyl alcohol, isopropyl alcohol, n-butyl alcohol, isobutyl alcohol, octyl alcohol, 2-ethylhexyl alcohol, benzyl alcohol, etc. Preferred in the present invention are those melamine resins etherified with a $C_4$ or higher alcohol, preferably a $C_4$–$C_7$ alcohol. There is no particular restriction as to the amount of ether group in melamine resin, but the amount is appropriately about 5 moles or less, preferably about 1.5–3 moles per one triazine ring. There is no particular restriction, either, as to the kinds and amounts of residual functional groups (e.g. amino group, imino group and methylol group) in melamine resin, as long as the requirements for solvent dilution and molecular weight are satisfied. However, it is preferable that the amounts of imino group (including amino group) and methylol group are generally each 0.2–2.0 moles, particularly 0.5–1.5 moles per one triazine ring.

Preferably, the hydrophobic crosslinking agent is mixed with a water-soluble resin before the agent is mixed with the acrylic resin emulsion (a) and the urethane resin emulsion (b). As the water-soluble resin, there can be used reins having hydrophilic groups such as carboxyl group (—COOH), hydroxyl group (—OH), methylol group (—CH$_2$OH), amino group (—NH$_2$), sulfone group (—SO$_3$H), polyoxyethylene linkage [—(CH$_2$CH$_2$O)$_n$—] and the like. Examples thereof are an acrylic resin, an alkyd resin and an epoxy resin. Of these, most typical is a resin obtained by introducing a carboxyl group and neutralizing the carboxyl group to form a salt which is water-soluble.

The proportions of the hydrophobic crosslinking agent and the water-soluble resin are appropriately such that the former is 100 parts by weight and the latter is generally 20–100 parts by weight, preferably 28–80 parts by weight, all in terms of solid content. Their mixing can be conducted by any desired method. For example, they are homogeneously mixed by the use of Disper, a homomixer, a ball mill, a sand mill or the like. At this time, a coloring pigment, an extender pigment, etc. may be added as necessary. Also, a small amount of a hydrophilic solvent such as alcohol, ether or the like may be added as necessary. Then, the mixture is vigorously stirred and deionized water is gradually added thereto in an amount of about 50–500 parts by weight per 100 parts by weight of the total of the hydrophobic melamine resin and the water-soluble resin, whereby a milk-white or colored aqueous dispersion is obtained. The average particle diameter of the solid content in the aqueous dispersion when the dispersion contains no pigment, can be generally about 0.05–0.5 μm, preferably 0.1–0.4 μm.

With respect to the proportions of the acrylic resin emulsion (a), the urethane resin emulsion (b) and the crosslinking agent (c) in the coloring base coating (C), the acrylic resin emulsion (a)/the crosslinking resin (c) is preferably 90/10 to 60/40, particularly 85/15 to 70/30 by weight ratio. [The acrylic resin emulsion (a)+the crosslinking agent (c)]/the urethane resin emulsion (b) is preferably 95/5 to 60/40, particularly 90/10 to 70/30 by weight ratio.

The coloring base coating (C) is a thermosetting aqueous coating which contains the acrylic resin emulsion (a), the urethane resin emulsion (b) and the crosslinking agent (c) as vehicle components and which further contains a coloring pigment and other additives. The thermosetting aqueous coating, when coated and crosslinked/cured, must form a film having a value of N 7 to N 9, particularly preferably N 7.5 to N 8.8 in Munsell's color system. When the value is smaller than N 7 in Munsell's color system, the uniformity of iridescence is low and uneven iridescence tends to appear. When the value is larger than N 9, the color of the intermediate coating film can be seen through, which is not preferable.

In order for the film formed with the coloring base coating (C) to have a value of the above range in Munsell's color system, the base coating (C) must contain a coloring pigment. The pigment is particularly preferably a mixture of titanium dioxide and carbon black; however, the pigment is not restricted thereto and there can also be used inorganic or organic pigments such as iron oxide, chromium oxide, lead chromate, Phthalocyanine Green, Carbazole Violet, Anthrapyrimidine, Flavanthrone Yellow, Isoindoline Yellow, Indanthrene Yellow, Quinacridone Violet and the like. The coloring base coating (C) generally need not contain a metallic pigment or iridescent scaly mica.

In the present process, the coloring base coating (C) can be applied on the crosslinked and cured film of the intermediate coating (B) by a method such as electrostatic coating, air spraying, airless spraying or the like. Preferably, the coloring base coating (C) is applied in a film thickness of generally 5–50μ, particularly 5–20μ as cured.

The dried film of the coloring base coating (C) can be crosslinked and cured generally at a temperature of about 100°–170° C. In the present process, however, the iridescent base coating (D) (described below) is coated on said dried film without subjecting said dried film to crosslinking and curing.

Iridescent Base Coating (D)

The iridescent base coating (D) applied on the film of the coloring base coating (C) is a thermosetting aqueous coating which contains a scaly mica powder coated with titanium oxide and which further contains, as vehicle components, an acrylic resin emulsion (a), a urethane resin emulsion (b) and a crosslinking agent (c).

The scaly mica powder coated with titanium oxide is known as a pigment used for formation of an iridescent coating film. The scaly mica powder coated with titanium oxide is obtained by coating the surface of scaly mica powder with titanium oxide, and its particle size is preferably 5–60μ, particularly 5–25μ in terms of maximum diameter and its thickness is preferably 0.25–1.5μ, particularly 0.5–1μ. While the color of the cured film of the iridescent base coating (D) varies depending upon the thickness of the titanium oxide coated on the scaly mica powder, the thickness of titanium oxide coated can be generally 0.001–1μ, preferably 0.04–0.06μ.

the vehicle components used in the iridescent base coating (D) can be the same acrylic resin emulsion (a), urethane resin emulsion (b) and crosslinking agent (c) as mentioned in the coloring base coating (C). By dispersing the scaly mica powder coated with titanium oxide, in these vehicle components, the iridescent base coating (D) can be obtained. The proportions of the acrylic resin emulsion (a), the urethane resin emulsion (b) and the crosslinking agent (c) can be appropriately varied in the ranges mentioned in the coloring base coating (C).

The amount used of the scaly mica powder coated with titanium oxide is not strictly restricted and can be varied in a wide range depending upon the properties required for the intended multilayer film; however, the preferably amount is generally 3–20 parts by weight, particularly 7–13 parts by weight per 100 parts by weight of the total resin content of the vehicle components.

The iridescent base coating (D) contains, as essential components, the vehicle components and the scaly mica powder coated with titanium oxide as mentioned above. It can further contain, as necessary, flaky pigments such as silver-plated glass flakes, titanium-coated graphite, titanium flakes, platy iron oxide, Phthalocyanine flakes and the like, and can furthermore contain other additives for coating as necessary.

In the present process, the iridescent base coating (D) can be applied on the dried film (non subjected to crosslinking and curing) of the coloring base coating (C), by a per se known method such as electrostatic coating, air spraying, airless spraying or the like. Preferably, the coating (D) is applied in a film thickness of generally 5–25μ, particularly 7–15μ as cured.

The film of the iridescent base coating (D), similarly to that of the coloring base coating (C), can be crosslinked and cured generally at a temperature of about 100°–170° C. In the present process, however, the film is subject only to preliminary drying at a temperature of about 50°–100° C., particularly about 70°–90° C. without subjecting the film to substantial crosslinking and curing. The preliminary drying is conducted under such a condition that all or most of the volatile components (e.g. water) contained in the film are vaporized but the crosslinking agent (c) is substantially unreacted and remains in the film. After the preliminary drying, the clear coating (E) (described below) is applied on the film of the iridescent base coating (D).

Clear Coating (E)

As the clear coating (E) applied on the preliminarily dried film of the iridescent base coating (D), a per se known clear coating can be used. Specific examples thereof are organic solvent type clear coatings containing, as a vehicle component, a resin such as amino alkyd resin, acrylic resin, amino acrylic resin, amino oil-free alkyd resin, silicon polyester resin, fluororesin, urethane resin or the like. A high-solid clear coating containing a small amount of an organic solvent is desirable in view of, in particular, environmental protection, resource saving, etc. A powder coating can also be used.

It is particularly preferable to use, as the high-solid clear coating, an organic solvent type thermosetting high-solid clear coating containing, as main components, an acrylic resin, a hexaalkoxymethylmelamine and an acid catalyst.

In the above high-solid clear coating, the acrylic resin is obtained by polymerizing a monoester between (meth-)acrylic acid and a $C_1$ to $C_{20}$ monohydric alcohol, a hydroxyl group-containing vinyl monomer (these are main components) and, as necessary, a carboxyl group-containing vinyl monomer, other vinyl monomer, etc. The acrylic resin preferably has a number-average molecular weight of about 1,000–100,000, particularly about 8,000–50,000, a hydroxyl value of 50–200, particularly 60–120 and an acid value of 0–50, particularly 5–20.

The acrylic resin can be modified with a reaction product between ε-caprolactone and a hydroxyl group-containing vinyl monomer, or can be used together with a ring-opening polyester of ε-caprolactone.

The hexaalkoxymethylmelamine is a crosslinking agent for the acrylic resin and can be obtained by fully etherifying hexamethylolmelamine with a $C_1$–$C_4$ monohydric alcohol. In the hexaalkoxymethylmelamine, all of the six methylol groups possessed by hexamethylolmelamine are alkyl-etherified, and the alkyl groups may be the same or different. The alkyl groups are particularly preferably methyl, ethyl, n-butyl, isobutyl, etc.

The acid catalyst functions as an accelerator for the crosslinking reaction between the acrylic resin and the hexaalkoxymethylmelamine. It includes, for example, dodecylbenzenesulfonic acid, p-toluenesulfonic acid, dinonylnaphthalenedisulfonic acid, etc. These compounds may be blocked with an amine.

The organic solvent must be able to dissolve or disperse the above-mentioned components. It preferably is at least one organic solvent used in the coating industry, selected from, for example, hydrocarbon type solvents, alcohol type solvents, ester type solvents, ketone type solvents, ether type solvents, etc.

In the high-solid clear coating, the proportions of the acrylic resin and the hexaalkoxymethylmelamine are preferably such that the former is 45–85% by weight, particularly 60–75% by weight and the latter is 55–15% by weight, particularly 40–25% by weight, all based on the total weight of the two components. The proportion of the acid catalyst is appropriately 0.1–5 parts by weight, particularly 0.5–3 parts by weight per 100 parts by weight of the total of the two components. The solid content of the high-solid clear coating when it is applied, can be selected as desired, but preferably is generally 40–65% by weight, particularly 45–60% by weight.

The clear coating can further contain, as necessary, a coloring pigment such as mentioned previously, as long as it does not impair transparency. The clear coating can furthermore contain, as necessary, additives such as ultraviolet absorber, light stabilizer, film surface conditioner and the like.

In the present process, the clear coating (E) can be applied on the preliminarily dried film of the iridescent base coating (D) by a per se known method such as electrostatic coating, air spraying, airless spraying or the like. Preferably, the clear coating (E) is applied in a film thickness of generally 10–80μ, particularly 30–60μ as cured.

The film of the clear coating (E) can be crosslinked and cured at a temperature of about 100°–170° C. In the present process, however, the three films of the coloring base coating (C), the iridescent base coating (D) and the clear coating (E) are crosslinked and cured simultaneously. Therefore, the films prepared as above are heated at a temperature of about 100°–160° C., preferably about 130°–150° C. for about 10–60 minutes.

By the present process described above, a multilayer film can be formed on a material such as automobile body panel or the like. The main meritorious effects provided by the present process are as follows.

(1) Use of aqueous coatings at least for the cationic electrocoating (A), the coloring base coating (C) and the iridescent base coating (D) is effective for environmental pollution prevention and resource saving.

(2) Application of the clear coating (E) on the film of the iridescent base coating (D) subjected to preliminary drying prevents mixing of the two coatings. As a result, the orientation of the scaly mica of the iridescent base coating (D) is not disrupted by the color coating (E), and the iridescent film formed by the iridescent base coating (D) can have better depth feeling. Moreover, the preliminary drying of the iridescent base coating (D) film can prevent formation of film defects such as popping, sagging and the like.

(3) Since the iridescent base coating (D) is an aqueous coating, the scaly mica present therein is easily oriented parallel to the sublayer as compared with when the scaly mica is present in an organic solvent type coating. As a result, the iridescence given by the pigment is sharp and there can be obtained excellent pearl luster feeling and depth feeling. The reason is presumed to be that the aqueous coating when applied on the sublayer has a smaller solid content than the organic solvent type coating does (in other words, the aqueous coating contains a larger amount of a volatile component) and therefore gives rise to higher volume contraction during the film formation; moreover, the aqueous coating has a high viscosity; consequently, the scaly mica in the aqueous coating is easily oriented parallel to the sublayer.

(4) The coloring base coating (C) and the iridescent base coating (D) are each a thermosetting aqueous coating containing, as vehicle components, an acrylic resin emulsion (a), a urethane resin emulsion (b) and a crosslinking agent (c). Therefore, in the films formed by these coatings, the fluidity during baking can be reduced by the interaction between emulsion particles; thereby, the movement of the scaly mica coated with titanium oxide, present in the iridescent base coating (D) is suppressed and the scaly mica is kept parallel to the sublayer; as a result, a multilayer film of excellent iridescence feeling can be obtained.

EXAMPLES

The present invention is hereinafter described specifically with reference to Examples and Comparative Examples. In these Examples, parts and % are by weight.

Preparation of Coatings (C) and Coatings (D)

(1) Preparation of vehicle components used in coloring base coatings (C) and iridescent base coatings (D)

(1-1) Acrylic resin emulsion (a-1)

In a reactor were placed 140 parts of deionized water, 2.5 parts of 30% Newcol 707SF (a surfactant manufactured by NIPPON NYUKAZAI CO., LTD.) and 1 part of the following monomer mixture (1). They were stirred in a nitrogen current. Thereto was added 3 parts of 3% ammonium persulfate at 60° C. Then, the mixture was heated to 80° C. Thereto was added, in 4 hours by the use of a metering pump, a monomer emulsion consisting of 79 parts of the following monomer mixture (1), 2.5 parts of 30% Newcol 707SF, 4 parts of 3% ammonium persulfate and 42 parts of deionized water. After the addition, aging was conducted for 1 hour.

To the mixture being kept at 80° C. were dropwise added, in 1.5 hours, 20.5 parts of the following monomer mixture (2) and 4 parts of a 3% aqueous ammonium persulfate solution simultaneously. After the addition, aging was conducted for 1 hours. Thereafter, dilution with 30 parts of deionized water was conducted, followed by filtration through a 200-mesh nylon cloth at 30° C. To the filtrate was added deionized water, followed by pH adjustment to 7.5 with dimethylaminoethanolamine, whereby was obtained an acrylic resin emulsion (a-1) having an average particle diameter of 0.1 μm and a nonvolatile content of 20%.

| Monomer mixture (1) | |
|---|---|
| Methyl methacrylate | 55 parts |
| Styrene | 8 parts |
| n-Butyl acrylate | 9 parts |
| 2-Hydroxyethyl acrylate | 5 parts |
| 1,6-Hexanediol diacrylate | 2 parts |
| Methacrylic acid | 1 part |
| Monomer mixture (2) | |
| Methyl methacrylate | 5 parts |
| n-Butyl acrylate | 7 parts |
| 2-Ethylhexyl acrylate | 5 parts |
| Methacrylic acid | 3 parts |
| 30% Newcol 707SF | 0.5 part |

(1-2) Acrylic resin emulsion (a-2)

An acrylic resin emulsion (a-2) having an average particle diameter of 0.1 μm and a nonvolatile content of 20% was obtained in the same manner as in the above (1-1) except that the following monomer mixture (3) was used in place of the monomer mixture (1).

| Monomer mixture (3) | |
|---|---|
| Methyl methacrylate | 52.5 parts |
| Styrene | 10 parts |
| n-Butyl acrylate | 9 parts |
| 2-Hydroxyethyl acrylate | 5 parts |
| Allyl methacrylate | 2.5 parts |
| Methacrylic acid | 1 part |

(1-3) Urethane resin emulsion (b-1)

Into a polymerization vessel were fed 115.5 parts of a polybutylene adipate having a number-average molecular weight of 2,000, 115.5 parts of a polycaprolactonediol having a number-average molecular weight of 2,000, 23.2 parts of dimethylolpropionic acid, 6.5 parts of 1,4-butanediol and 120.1 parts of 1-isocyanato-3-isocyanatomethyl-3,5,5-trimethylcyclohexane (IPDI). The mixture was stirred in a nitrogen gas atmosphere at 85° C. for 7 hours to give rise to a reaction to obtain an NCO-terminated prepolymer having an NCO content of 4.0%. The prepolymer was cooled to 50° C. Thereto was added 165 parts of acetone, followed by stirring to obtain a uniform solution. Thereto was added 15.7 parts of triethylamine with stirring. To the mixture being stirred and kept at 50° C. or below was added 600 parts of deionized water. The resulting aqueous dispersion was kept at 50° C. for 2 hours to complete a reaction for chain extension by water. The resulting dispersion was subjected to distillation at 70° C. or below under reduced pressure to remove acetone, whereby 944 parts of a urethane resin emulsion (b-1) having a solid content of 42.0% was obtained.

(1-4) Urethane resin emulsion (b-2)

Into a pressure polymerization vessel were fed 115.5 parts of a polypropylene glycol having a number-average molecular weight of 2,100, 115.5 parts of a polytetramethylene ether glycol having a number-average molecular weight of 2,000, 23.2 parts of dimethylolpropionic acid, 6.7 parts of trimethylolpropane, 141.7 parts of 4,4'-dicyclohexylmethane diisocyanate and 174 parts of acetone. The atmosphere inside the vessel was replaced by nitrogen gas. The vessel contents were stirred at 85° C. for 5 hours to give rise to a reaction to obtain an acetone solution of an NCO-terminated prepolymer having an NCO content of 2.6%. The subsequent procedure was the same as in the above (1-3), whereby was obtained 1,045 parts of a urethane resin emulsion (b-2) having a solid content of 40.1%.

(1-5) Urethane resin emulsion (b-3)

Into a polymerization vessel were fed 115.5 parts of a polycaprolactonediol having a number-average molecular weight of 2,050, 115.5 parts of a polyneopentyl/hexyl adipate having a number-average molecular weight of 2,450, 9.9 parts of 1,6-hexanediol and 141.7 parts of 4,4'-dicyclohexylmethane diisocyanate. They were reacted at 110° C. for 3 hours in a nitrogen atmosphere. Thereto was added 23.2 parts of dimethylolpropionic acid. A reaction was allowed to take place at the same temperature for 3 hours to obtain a prepolymer having an NCO content of 3.7%. Thereto was added 176 parts of acetone, followed by stirring to obtain a uniform solution. The acetone solution containing a prepolymer was poured into 640 parts of water containing 16.7 parts of triethylamine, placed in a separate reactor, with high-speed stirring. The subsequent procedure was the same as in the above (1-3), whereby was obtained 1,018 parts of a urethane resin emulsion (b-3) having a solid content of 41.5%.

(1-6) Production of water-soluble resin

Into a reactor were fed 60 parts of butyl cellosolve and 15 parts of isobutyl alcohol. They were heated to 115° C. in a nitrogen current. Then, thereto was added, in 3 hours, a mixture consisting of 26 parts of n-butyl acrylate, 47 parts of methyl methacrylate, 10 parts of styrene, 10 parts of 2-hydroxyethyl methacrylate, 6 parts of acrylic acid and 1 part of azoisobutyronitrile. After the addition, the mixture was aged at 115° C. for 30 minutes. Thereto was added, in 1 hour, a mixture consisting of 1 part of azobisisobutyronitrile and 115 parts of butyl cellosolve. The mixture was aged for 30 minutes and then filtered through a 200-mesh nylon cloth at 50° C.

The resulting reaction product had an acid value of 48, a viscosity of Z4 as measured by a Gardner-Holdt bubble viscometer and a nonvolatile content of 55%. It was neutralized with an equivalent amount of dimethylaminoethanol and then mixed with deionized water, to obtain a 50% aqueous acrylic resin solution.

(1-7) Crosslinking agent (c-1)

In a vessel was placed 41.7 parts of a hydrophobic melamine resin (Uban 28SE manufactured by MITSUI TOATSU CHEMICALS, INC., nonvolatile content=60%, solvent dilution=0.4). Thereto was added 20 parts of the aqueous acrylic resin solution obtained in the above (1-6). They were stirred at 1,000–1,500 rpm by the use of Disper. Thereto was gradually added 80 parts of deionized water.

Stirring was continued for a further 30 minutes to obtain a crosslinking agent (c-1) of aqueous dispersion form having an average particle diameter of 0.11μ.

(2) Preparation of coloring base coatings (C)

Five kinds of coloring base coatings (C) were prepared by using the vehicle components obtained in the above (1-1) to (1-7) and by using the formulations shown in the following Table 1. Incidentally, "parts" mentioned with respect to each component in Table 1 refers to parts of solid content.

TABLE 1

| Components | C-1 | C-2 | C-3 | C-4 | C-5 |
|---|---|---|---|---|---|
| Acrylic resin emulsion | | | | | |
| (a-1) (parts) | 65 | | 65 | 85 | |
| (a-2) (parts) | | 65 | | | |
| Urethane resin emulsion | | | | | |
| (b-1) (parts) | 15 | | | | |
| (b-2) (parts) | | 15 | | | |
| (b-3) (parts) | | | 15 | | |
| Crosslinking agent (c-1) (parts) | 20 | 20 | 20 | 20 | |
| Titanium dioxide*1 | 99.98 | 99.98 | 99.98 | 99.98 | 99.98 |
| Carbon black*2 | 0.02 | 0.02 | 0.02 | 0.02 | 0.02 |
| Solid content (%) | 20 | 20 | 20 | 20 | 28 |
| N in Munsell's color system | 8.5 | 8.5 | 8.5 | 8.5 | 8.5 |

*1 CR95 of ISHIHARA SANGYO KAISHA, LTD.
*2 CABOT Monark 1300

Of the above (C-1) to (C-5), (C-1) to (C-3) are for use in Examples and (C-4) to (C-5) are for use in Comparative Examples.

(C-5) is an organic solvent type coloring base coating obtained by dispersing, in a vessel, 100 parts of a mixed pigment consisting of 99.98 parts of titanium dioxide and 0.02 part of carbon black, per 100 parts of the total solid content of the acrylic resin and the melamine resin and by adjusting the solid content to 28% and the viscosity to 12 seconds as measured by a Ford cup No. 4 method at 20° C. The film of (C-5) had a value of N 8.5 in Munsell's color system.

(3) Preparation of iridescent base coatings (D)

Seven kinds of iridescent base coatings (D) were prepared by using the vehicle components obtained in the above (1-1) to (1-7) and by using the formulations shown in the following Table 2. Incidentally, "parts" mentioned with respect to each component in Table 2 refers to parts of solid content.

TABLE 2

| Components | D-1 | D-2 | D-3 | D-4 | D-5 | D-6 | D-7 |
|---|---|---|---|---|---|---|---|
| Acrylic resin emulsion | | | | | | | |
| (a-1) (parts) | 65 | | | 65 | 80 | 65 | 65 |
| (a-2) (parts) | | 65 | | | | | |
| Urethane resin emulsion | | | | | | | |
| (b-1) (parts) | 15 | | | | | 15 | 15 |
| (b-2) (parts) | | 15 | | | | | |
| (b-3) (parts) | | | 15 | | | | |
| Crosslinking agent (c-1) (parts) | 20 | 20 | 20 | 20 | 20 | 20 | |
| Scaly mica coated with titanium oxide | 10 | 10 | 10 | 10 | 5 | 15 | 10 |
| Solid content (%) | 20 | 20 | 20 | 20 | 20 | 20 | 20 |
| Coating viscosity (cps) | 2500 | 2500 | 2500 | 2500 | 2500 | 2500 | 13 seconds |

Of the above (D-1) to (D-7), (D-1) to (D-3) are for use in Examples and (D-4) to (D-7) are for use in Comparative Examples.

In Table 2, the scaly mica coated with titanium oxide is IRIOZIN 103R (trade name) (a product of Merck & Co., Inc., maximum diameter=45μ, average particle diameter= 20μ, thickness=0.5—0.5μ).

(D-7) is an organic solvent type iridescent base coating obtained by dispersing, in a vessel, 10 parts of scaly mica coated with titanium oxide per 100 parts of the total solid content of the acrylic resin and the melamine resin and by adjusting the solid content to 20% and the viscosity to 13 seconds as measured by a Ford cup No. 4 method at 20° C.

EXAMPLES AND COMPARATIVE EXAMPLES

On a degreased and zinc phosphate-treated steel plate (JIS G 3141, 400 mm×300 mm×0.8 mm) was electrocoated, by an ordinary method, a cationic electrocoating (A) [ELECRON 9400 HB (trade name), a product of Kansai paint Co., Ltd. containing an epoxy resin type cationic resin and a blocked polyisocyanate (a curing agent)] so as to give a film of 20μ in thickness as cured. The coated cationic electrocoating was heated at 170° C. for 20 minutes for crosslinking and curing. On the cured film of the cationic electrocoating (A) was coated an intermediate coating (B) [LUGABAKE PRIMER SURFACER (trade name), a product of Kansai Paint Co., Ltd. containing a polyester resin-amino resin system and an organic solvent; had the same N value in Munsell's color system as the coloring base coatings (C-1) to (C-5)] so as to give a film of 40μ in thickness as cured. The coated intermediate coating was heated at 140° C. for 30 minutes for crosslinking and curing.

On the cured film of the intermediate coating (B) was coated one of the coloring base coatings (C-1) to (C-5) by the use of a minibell type rotary static electrocoating machine under the conditions of discharge amount=150 cc, 5,000 rpm, shaping pressure=1 kg/cm², gun distance=30 cm, booth temperature=20° C. and booth humidity=75%. The film thickness of the coloring base coating (C) was 10μ as cured.

The resulting plate was allowed to stand in the booth for 3 minutes. Then, on the plate was coated, in a wet-on-wet state and in two stages, one of the iridescent base coatings (D-1) to (D-7) by the use of a REA gun under the conditions of discharge amount=180 cc, atomization pressure=2.7 kg/cm², pattern pressure=3.0 kg/cm², gun discharge=30 cm, booth temperature=20° C. and booth humidity=75%. The film thickness of the iridescent base coating (D) was 3–5μ as cured, in each stage and 6–10μ in total.

The resulting plate was allowed to stand in the booth for 3 minutes and then heated at 80° C. for 10 minutes in a dryer of hot air circulation type to evaporate the most part of the volatile components present in the films of the coatings (C) and (D) and cooled to room temperature. Then, a clear coating (E) [LUGABAKE CLEAR (trade name), a product of Kansai Paint Co., Ltd. containing an acrylic resin-amino resin system and an organic solvent] was coated by the use of a minibell type rotary static electrocoating machine under the conditions of discharge amount=300 cc, 40,000 rpm, shaping pressure=1.5 kg/cm², gun distance=30 cm, booth temperature=20° C. and booth humidity=75%. The film thickness of the clear coating (E) was 45μ as cured. The resulting plate was allowed to stand in a room for 3 minutes and then heated at 140° C. for 30 minutes in a dryer of hot air circulation type to subject the films of the coloring base coating (C), the iridescent base coating (D) and the clear coating (E) simultaneously to crosslinking and curing.

The coatings used in the above procedure and the performance test results obtained for each multilayer film formed are shown in the following Table 3.

TABLE 3

|  | Examples | | | Comparative Examples | | | |
| --- | --- | --- | --- | --- | --- | --- | --- |
|  | 1 | 2 | 3 | 1 | 2 | 3 | 4 |
| Cationic electrocoating (A) | ELECRON 9400 HB | | | | | | |
| Intermediate Coating (B) | LUGABAKE PRIMER SURFACER | | | | | | |
| Coloring base coating (C) | C-1 | C-2 | C-3 | C-4 | C-1 | C-1 | C-5 |
| Iridescent base coating (D) | D-1 | D-2 | D-3 | D-4 | D-5 | D-6 | D-7 |
| Clear coating (E) | LUGABAKE CLEAR | | | | | | |
| Performance test results |  |  |  |  |  |  |  |
| Depth feeling | ○ | ○ | ○ | ○ | Δ | ○ | X |
| Iridescence feeling (IV) | 155 | 152 | 148 | 153 | 95 | 202 | 98 |
| Smoothness | 18 | 18 | 18 | 18 | 19 | 17 | 17 |
| Distinctness of image gloss | 1.0 | 1.0 | 1.0 | 1.0 | 1.2 | 0.7 | 0.7 |
| Chipping resistance | 0 | 0.1 | 0.1 | 2.1 | 1.2 | 1.3 | 2.7 |

Performance tests for each multilayer film were conducted as follows.

Depth feeling

Visually examined under a fluorescent light by ten experienced testers in charge of testing film finish. The ratings by ten testers were totalized. ○ indicates "good"; Δ indicates "borderline good"; X indicates "bad".

Iridescence feeling

An IV was measured by the use of ALCOPE LMR 100 (trade name), a product of Fuji Kogyo K.K. A higher IV indicates better iridescence feeling.

Smoothness

Measured by the use of a tension meter manufactured by RENAULT CO. A larger number of smoothness indicates better smoothness.

Distinctness of image gloss

Measured by the use of a portable distinctness of image gloss meter (P.G.D.-IV manufactured by JAPAN COLOUR RESEARCH INSTITUTE). A larger number of distinctness of image gloss indicates better distinctness of image gloss.

Chipping resistance

Measured by the use of a gravelometer manufactured by Suga Test Instrument Co., Ltd. under the conditions of temperature=20° C., No.7 crushed stone=50 g, spraying pressure 4 kg/cm² and angle=45°. The area of the film peeled after spraying was measured.

What is claimed is:

1. A process for forming a multilayer film on a substrate, which comprises:

applying a cationic electrocoating (A) and an intermediate coating (B), in the given order to a surface of the substrate, followed by heat-curing, applying thereon a coloring base coating (C) which forms a colored film having a value of N7 to N9 in Munsell's color system, applying, without curing the coloring base coating (C) applied above, an iridescent base coating (D) containing a scaly mica powder coating with titanium oxide, followed by preliminary drying at 50°–100° C., and applying a clear coating (E), followed by heating to subject films of the coatings (C), (D) and (E) simultaneously to crosslinking and curing, wherein the coloring base coating (C) and the iridescent base coating (D) are each a thermosetting aqueous coating containing, as vehicle components, an acrylic resin emulsion (a), a urethane resin emulsion (b) and a crosslinking agent (c).

2. The process according to claim 1, wherein the applied cationic electrocoating (A) has a film thickness of 10–40 μm as cured.

3. The process according to claim 1, wherein the applied intermediate coating (B) has a film thickness of 10–50 μm as cured.

4. The process according to claim 1, wherein the cationic electrocoating (A) is applied and cured and then the intermediate coating (B) is applied.

5. The process according to claim 1, wherein the coloring base coating (C) forms a colored film having a value of N 7.5 to N 8.8 in Munsell's color system.

6. The process according to claim 1, wherein the acrylic resin emulsion (a) is obtained by emulsion-polymerizing an acrylic monomer with an α,β-ethylenically unsaturated carboxylic acid, optionally with other copolymerizable monomer.

7. The process according to claim 6, wherein the acrylic resin emulsion (a) is obtained by multistage polymerization which comprises first (co)polymerizing an acrylic monomer containing about 3% by weight or less based on the total monomers or no α,β-ethylenically unsaturated acid, optionally with other copolymerizable monomer and subsequently (co)polymerizing the resulting polymer with an acrylic monomer containing about 5–30% by weight based on the total monomers, the unsaturated acid, and optionally with other copolymerizable monomer.

8. The process according to claim 1, wherein the urethane resin emulsion (b) is an aqueous dispersion of a self-emulsifiable urethane resin having an average particle diameter of about 0.001 to about 1.0 μm, prepared by polymerizing an aliphatic or alicyclic diisocyanate, a polyetherdiol or polyesterdiol having a number-average molecular weight of 500–5,000 or a mixture thereof, a low-molecular weight polyhydroxyl compound and a dimethylolalkanoic acid in the presence or absence of a hydrophilic organic solvent having no active hydrogen group in the molecule, in an NCO/OH equivalent ration of 1.1–1.9 by one shot method or multistage method to form a urethane prepolymer, then mixing the prepolymer with water after or while neutralizing the prepolymer with an amine, to simultaneously give rise to (1) a reaction for chain extension by water and (2) emulsification and dispersion in water, and optionally distilling off the organic solvent.

9. The process according to claim 8, wherein the diisocyanate is an alicyclic diisocyanate, comprising 1,4-cyclohexane diisocyanate, 1-isocyanato-3-isocyanato-3,5,5-trimethylcyclohexane or 4,4'-dicyohexylmethane diisocyanate.

10. The process according to claim 8, wherein the polyetherdiol or polyesterdiol has a number-average molecular weight of 1,000–3,000.

11. The process according to claim 8, wherein the low-molecular weight polyhydroxyl compound is butanediol, trimethylolpropane or hexanediol.

12. The process according to claim 8, wherein the low-molecular polyhydroxyl compound is used in an amount of 0.1–20% by weight based on the total amount of the polyetherdiol and the polyesterdiol.

13. The process according to claim 8, wherein the dimethylolalkanoic acid is dimethylolacetic acid, dimethylolpropionic acid or dimethylolbutyric acid, particularly dimethylolpropionic acid.

14. The process according to claim 8, wherein the dimethylolalkanoic acid is used in such an amount that the amount of carboxyl group in the urethane prepolymer becomes 0.5–5% by weight.

15. The process according to claim 1, wherein the crosslinking agent (c) is a hydrophobic melamine resin having a solvent dilution of 20 or less and a weight-average molecular weight of 800–4,000.

16. The process according to claim 15, wherein the hydrophobic melamine resin is etherified with a $C_4$ to $C_7$ alcohol.

17. The process according to claim 15, wherein the crosslinking agent (c) is in the form of a mixture with a water-soluble resin.

18. The process according to claim 1, wherein the coloring base coating (C) and the iridescent base coating (D) each contain the acrylic resin emulsion (a) and the crosslinking agent (c) in a (a)/(c) weight ratio of 90/10 to 60/40.

19. The process according to claim 1, wherein the coloring base coating (C) and the iridescent base coating (D) each contain the acrylic resin emulsion (a), the urethane resin emulsion (b) and the crosslinking agent (c) in a [(a)+(c)]/(b) weight ratio of 95/5 to 60/40.

20. The process according to claim 1, wherein the coloring base coating (C) further contains a coloring pigment.

21. The process according to claim 20, wherein the coloring pigment is a mixture of titanium dioxide and carbon black.

22. The process according to claim 1, wherein the applied coloring base coating (C) has a film thickness of 5–50 μm as cured.

23. The process according to claim 1, wherein the iridescent base coating (D) contains the scaly mica powder coated with titanium oxide, in an amount of 3–20 parts by weight per 100 parts by weight of the total resin solid content of the vehicle components.

24. The process according to claim 1, wherein the applied iridescent base coating (D) has a film thickness of 5–25 μm as cured.

25. The process according to claim 1, wherein the clear coating (E) is a high-solid clear coating.

26. The process according to claim 25, wherein the high-solid clear coating is an organic solvent-containing thermosetting high-solid clear coating which contains, as main components, an acrylic resin, a hexaalkoxymethylmelamine and an acid catalyst.

27. The process according to claim 26, wherein the acrylic resin has a number-average molecular weight of 1,000–10,000, a hydroxyl group of 50–200 and an acid value of 0–50.

28. The process according to claim 26, wherein the high-solid clear coating contains the acrylic resin and the hexaalkoxymethylmelamine in amounts of 45–85% by weight and 55–15% by weight, respectively, both based on the total weight of the acrylic resin and the hexaalkoxymethylmelamine.

29. The process according to claim 26, wherein the high-solid clear coating contains an acid catalyst in an amount of 0.1–5 parts by weight per 100 parts by weight of the total of the acrylic resin and the hexaalkoxymethylmelamine.

30. The process according to claim 1, wherein the applied clear coating (E) has a film thickness of 10–80 μm as cured.

31. The process according to claim 1, wherein the films of the coatings (C), (D) and (E) are simultaneously subjected to crosslinking and curing at a temperature of about 100°–160° C.

32. An article having a multilayer film formed by the process of claim 1.

\* \* \* \* \*